Nov. 14, 1967  M. A. PANZARDI  3,352,184
SAFETY CHANNEL FOR RADIATOR OVERBOIL
Filed May 3, 1965
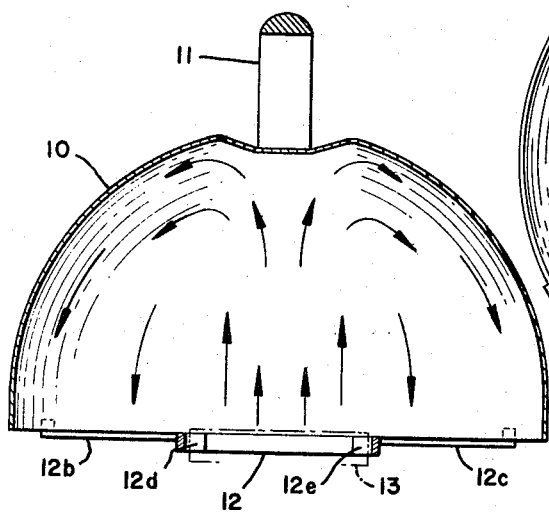
FIG_1
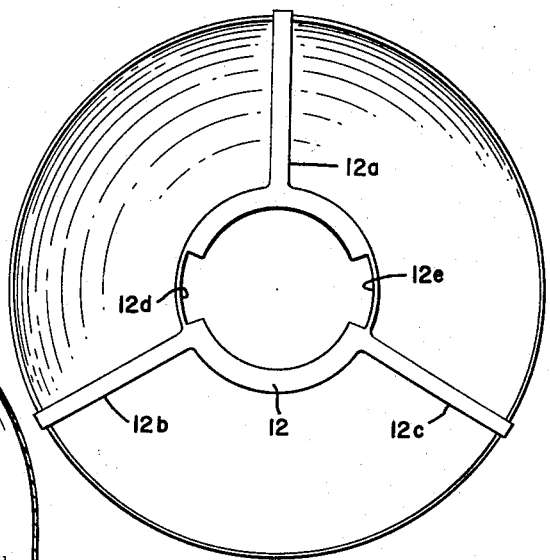
FIG_2
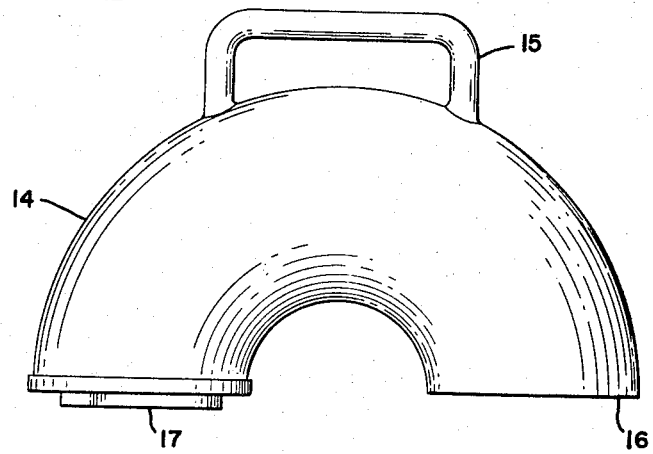
FIG_3
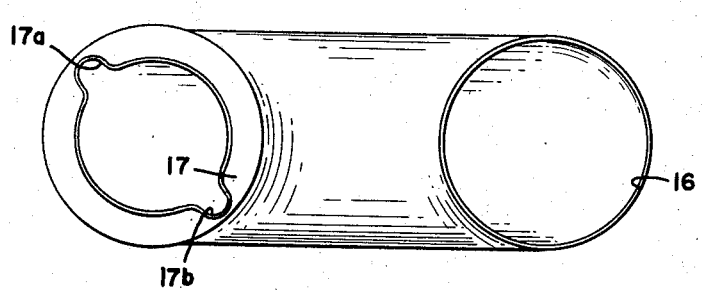
FIG_4
INVENTOR.
MANUEL A. PANZARDI
BY
Allen and Chromy
ATTORNEYS

United States Patent Office 3,352,184
Patented Nov. 14, 1967

3,352,184
SAFETY CHANNEL FOR RADIATOR OVERBOIL
Manuel A. Panzardi, 315 W. Palmer Glen,
Glendale, Calif. 91204
Filed May 3, 1965, Ser. No. 452,748
3 Claims. (Cl. 81—3.1)

This invention relates to a device providing a safety channel for automotive radiator overboil.

An object of this invention is to provide an improved device for use in releasing the radiator cap of an automotive radiator under pressure of hot fluid therein, said device having a safety channel for automotive radiator overboil.

Another object of this invention is to provide an improved device for releasing the cap from a hot automotive radiator, said device having a hollow body for receiving the released radiator cap and for deflecting any hot water that may be ejected from the radiator upon release of the cap so that such hot water will not splatter over the attendant releasing the cap.

Another object of this invention is to provide an improved device for removing the cap from a hot radiator, said device having a hollow body with a bottom member shaped to encircle and grip the radiator cap whereby the cap may be released by turning said hollow body and the bottom attached thereto.

Other and further objects of this invention will be apparent to those skilled in the art to which it relates from the following specification, claims and drawing.

Referring to the drawing briefly:

FIG. 1 is a vertical sectional view of an embodiment of this invention;

FIG. 2 is a bottom view of the device shown in FIG. 1;

FIG. 3 is a view in side elevation of a modified form of this device; and

FIG. 4 is a bottom view of the device shown in FIG. 3.

Referring to the drawing in detail, reference numeral 10 designates a hollow body which, in this case, may be in the shape of a substantially hemispherical hood. This hollow body may be made of suitable metal or plastic, as desired, and it is provided with a handle 11 at the top thereof which is attached to the hollow body by suitable screws, adhesive, welding, soldering or the like. The hollow body 10 is provided with a bottom member 12 which is in the form of a spider having radially extending arms 12a, 12b and 12c, the ends of which are attached to the bottom of the hollow body by solder, cement or the like so that the bottom member 12 is firmly attached to the body.

The bottom member 12 is provided with oppositely disposed recesses 12d and 12e which are adapted to receive the side projections extending from the radiator cap 13. Thus, when this device is placed over the radiator cap so that said cap is received in the bottom member 12, rotating the device by rotating the handle 11 thereof turns the radiator cap 13 and releases its grip from the throat of the radiator. This permits the radiator cap to be removed from the radiator, and if the liquid in the radiator is hot and under pressure, then the cap may be ejected a short distance into the hollow body 10.

At the same time, the hot liquid will flow or splatter out of the radiator into the hollow body 10 past the radiator cap and will be deflected by this hollow body so that it does not splash on the attendant. As a result, the attendant is protected from receiving painful burns from the hot liquid. After the pressure in the radiator is reduced, the body member 10 may be removed and the radiator filled with cool liquid, after which the radiator cap is replaced thereon.

In FIGS. 3 and 4 there is shown a modified form of this device in which the hollow body 14 is made of U-shaped configuration. The end 16 of the body 14 is open, and the other end is provided with a bottom member 17. A handle 15 is attached to the top of the hollow body so that said hollow body may be readily rotated when the bottom member 17 is placed over the radiator cap. The bottom member 17 is attached to the hollow body 14 by suitable cement, solder or the like, different attaching means being employed, depending upon whether the hollow body 14 is made of metal, plastic or the like. The bottom member 17 is provided with oppositely disposed recesses 17a and 17b for receiving corresponding projections of the radiator cap so that the bottom member may encircle and grip the radiator cap for rotation thereof.

The hollow body 14 is provided with a diameter substantially greater than the diameter of the radiator cap so that when the cap is released the fluid pressure in the radiator may move the cap a short distance into the hollow body, and the hot fluid from the radiator allowed to bypass the cap into the hollow body where it is deflected toward the open end 16. Thus, the hot fluid cannot splatter on the attendant.

While I have shown a preferred embodiment of the invention, it will be apparent the invention is capable of modification and variation from the form shown so that its scope should be limited only by the scope of the claims appended hereto.

What I claim is:

1. In a device for providing a safety channel for automotive radiator overboil when the radiator cap is removed, the combination of a hollow body having a handle attached to the top thereof, said hollow body having a bottom member attached thereto, said bottom member having a hole therein having a shape corresponding to the peripheral shape of the radiator cap so that said bottom member may be placed over said cap and rotated by rotating said hollow body, said hole communicating with the interior of said hollow body and of sufficient size to freely pass said radiator cap therethrough, said hollow body having a diameter substantially greater than the greatest diameter of the radiator cap so that when the radiator cap is released from the radiator by rotating said hollow body, the radiator cap may be ejected thereinto by fluid pressure in said radiator.

2. In a device for providing a safety channel for automotive radiator overboil when the radiator cap is removed, the combination as set forth in claim 1 further characterized in that said hollow body is in the shape of a hemisphere and said bottom member is attached thereto by radially extending arms, each of said arms having the outer end thereof attached to said body and the inner end thereof attached to said bottom member.

3. In a device for providing a safety channel for automotive radiator overboil when the radiator cap is removed, the combination as set forth in claim 1 further characterized in that said hollow body is of substantially U-shape and said bottom member is attached to one end thereof, the other end of said hollow body being open and pointed downward when said bottom member is placed over the radiator cap so that the liquid released from the radiator into said hollow member is directed downward.

References Cited

UNITED STATES PATENTS

| | | | |
|---|---|---|---|
| 2,599,668 | 6/1952 | Taylor | 81—90.3 |
| 2,746,330 | 5/1956 | Pfetzing | 81—53 |
| 3,014,389 | 12/1961 | O'Hara | 81—90.5 |
| 3,037,408 | 6/1962 | Rives et al. | 81—3.42 |
| 3,186,263 | 7/1965 | Grote | 81—3.1 |

WILLIAM F. O'DEA, *Primary Examiner.*

R. GERARD, *Assistant Examiner.*